United States Patent [19]

Smiley et al.

[11] 4,148,069
[45] Apr. 3, 1979

[54] AUTOMATIC CABLE LOSS COMPENSATOR FOR USE IN A TELEVISION CAMERA SYSTEM

[75] Inventors: Charles F. Smiley; Robert R. Weirather, both of Quincy, Ill.

[73] Assignee: Harris Corporation, Cleveland, Ohio

[21] Appl. No.: 768,099

[22] Filed: Feb. 14, 1977

[51] Int. Cl.² ............................................. H04N 5/14
[52] U.S. Cl. ..................................... 358/160; 358/185
[58] Field of Search ................ 358/160, 139, 149, 86, 358/185

[56] References Cited

U.S. PATENT DOCUMENTS

| | | | |
|---|---|---|---|
| 3,368,035 | 2/1968 | Dennison | 358/149 |
| 3,431,351 | 3/1969 | Sennhenn | 358/149 |

*Primary Examiner*—Richard Murray

[57] ABSTRACT

An automatic system for compensating for arbitrary amounts of attenuation introduced by arbitrary lengths of transmission cable being used to communicate multi-channel broadband RF signals between a television camera head and a remote camera control station. An attenuation detector is provided which monitors the peak amplitude of the signal in a selected frequency channel of the broadband signal to generate control signals which each change from a first state to a second state at a respective preselected attenuation level. These control signals are used to effect the selective bypassing of an attenuation pad located at the termination of the cable, fixed gain preamplifiers associated with the higher frequency channels of the broadband signal, and a second attenuation pad located at the output of the circuit which transmits the video signal to the viewfinder of the camera head.

6 Claims, 2 Drawing Figures

AUTOMATIC CABLE LOSS COMPENSATOR FOR USE IN A TELEVISION CAMERA SYSTEM

BACKGROUND AND FIELD OF THE INVENTION

The present invention relates to the art of television camera systems and more particularly to a system for compensating for cable attenuation introduced as a result of arbitrary cable lengths being used to interconnect a camera head with a remote camera control unit.

Studio television camera systems presently available provide for control of a number of television camera heads from a single remote camera control station. This is necessary in order to provide uniformity of picture quality as well as to insure proper timing between the various video signals supplied by the respective camera heads. In these systems, each of the cameras is interconnected with the camera control unit via a transmission cable which carries the respective timing, control, and video information to and from the camera.

Since this transmission cable may be of arbitrary length, anywhere from several hundred yards to in excess of a mile, the amount of attenuation introduced as a result of the presence of this cable will vary extensively. In the past, these variations have been balanced out through the use of an operator-controlled adjustment which was readjusted whenever a new cable was connected between the camera head and the control unit. A multiconductor cable having a separate conductor for each control signal was generally used to communicate the various signals between the camera head and the camera control station. Although this approach allowed extreme simplicity in the manner in which signals were communicated back and forth, the cost of the cable became a prohibitive factor when large distances were to be covered between the camera head and the control unit.

Much work has thus been directed to the problem of combining the signals to form a composite signal which could be easily transmitted along a standard triaxial transmission line. When a color television camera is being used, this composite signal must include video information from the red, blue, and green video plumbicon tubes, as well as power supply, timing, and control signals. In addition, a black and white video signal may be returned to the viewfinder of the camera head from the camera control station along the same cable. These signals may be combined by frequency division multiplexing, however the composite signal will then be quite broadband and may extend over a frequency band in excess of 60-MHz. The use of a broadband composite signal introduces complications with regards to transmission cable attenuation. Since the attenuation provided by a triaxial transmission line increases with the frequency of the transmitted signal, attenuation of the higher frequency channels will be significantly greater than in lower frequency channels and may lead to unacceptable degradation of the signals carried therein when lengthy transmission lines are used. Cable loss compensation of some form is thus required in a system of this nature. Any compensation scheme must also take into consideration the fact that the attenuation will not be the same for different frequency channels.

The present invention provides a cable loss compensation system which not only provides automatic adjustment of the gain of the incoming signals in accordance with a detection of the amount of cable attenuation, but also provides different gains in different frequency channels so as to substantially equalize the gain of the signals in the various frequency bands.

In accordance with the present invention, an automatic cable loss compensation system is provided for a television camera system wherein a television camera communicates with a camera control unit by means of a broadband RF signal communicated over a transmission cable of arbitrary length. The compensation means includes an attenuation detector which is responsive to the signal in a selected frequency band of the broadband RF signal to provide a control signal having a value which is dependent upon whether or not the peak amplitude of the signal is greater or smaller than a preselected reference level. An attenuation pad is provided which is normlly connected in series with the transmission line to prevent ghosting resulting from RF signl reflections on the cable, but is bypassed whenever the control signal indicates that the signal strength has fallen below the preselected reference level.

In accordance with another aspect of the present invention, the attenuation detector also compares the peak amplitude of the signal with a second reference level to provide a second control signal having a state which depends upon whether or not the peak signal is above or below the second reference level. This second control signal is then used to either insert or bypass an additional stage of RF amplification in one or more of the higher frequency channels of the broadband signal.

In accordance with yet another aspect of the present invention, this second control signal also controls the insertion or bypassing of another attenuation pad at the output to a viewfinder transmitter which generates high frequency RF signals which are to be communicated to the camera head.

BRIEF DESCRIPTION OF THE DRAWINGS

The foregoing and other objects and advantages of the present invention will become more readily apparent from the following description of the preferred embodiment, as taken in conjunction with the accompanying drawings which are a part thereof, and wherein.

DETAILED DESCRIPTION

Figure 1:
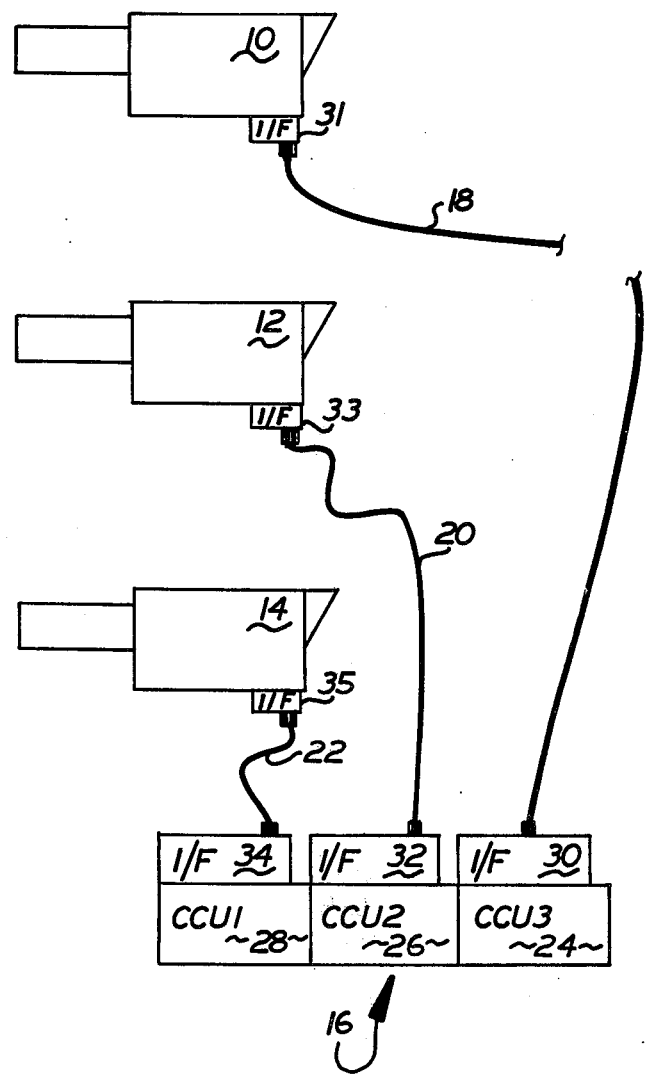
FIG. 1 is a general block diagram of a camera system.

Referring first to FIG. 1, there is shown a television camera system in which three cameras 10, 12, and 14 are interconnected with a remote control station 16 by means of respective transmission lines 18, 20, and 22. It will be seen that each of these transmission cables may be of arbitrary length. To more clearly illustrate this point, transmission line 18 is shown as being of extended length, while transmission line 22 is quite short. The signals supplied by the respective transmission lines are directed to control units at the remote station 16. Each of the camera heads 10, 12, and 14 has a corresponding camera control unit 24, 26, and 28. As described previously, each of these camera control units supplies timing and control information to the corresponding camera head. In addition, each camera head supplies color video signals to the corresponding camera control unit by means of the transmission line while receiving therefrom a black-and-white video signal which is displayed upon a viewfinder screen at the camera head so as to allow the operator to accurately position the camera. Interface units 30-35 serve to combine or separate these component signals are required to interface them with the composite signal used to communicate the information along the transmission line.

In accordance with the principles of the present invention, interface units 30, 32, and 34 associated with the camera control units, each further include an automatic cable loss compensator system for automatically compensating for the arbitrary lengths of transmission lines being used to interconnect the camera head and the respective camera control unit.

Figure 2:
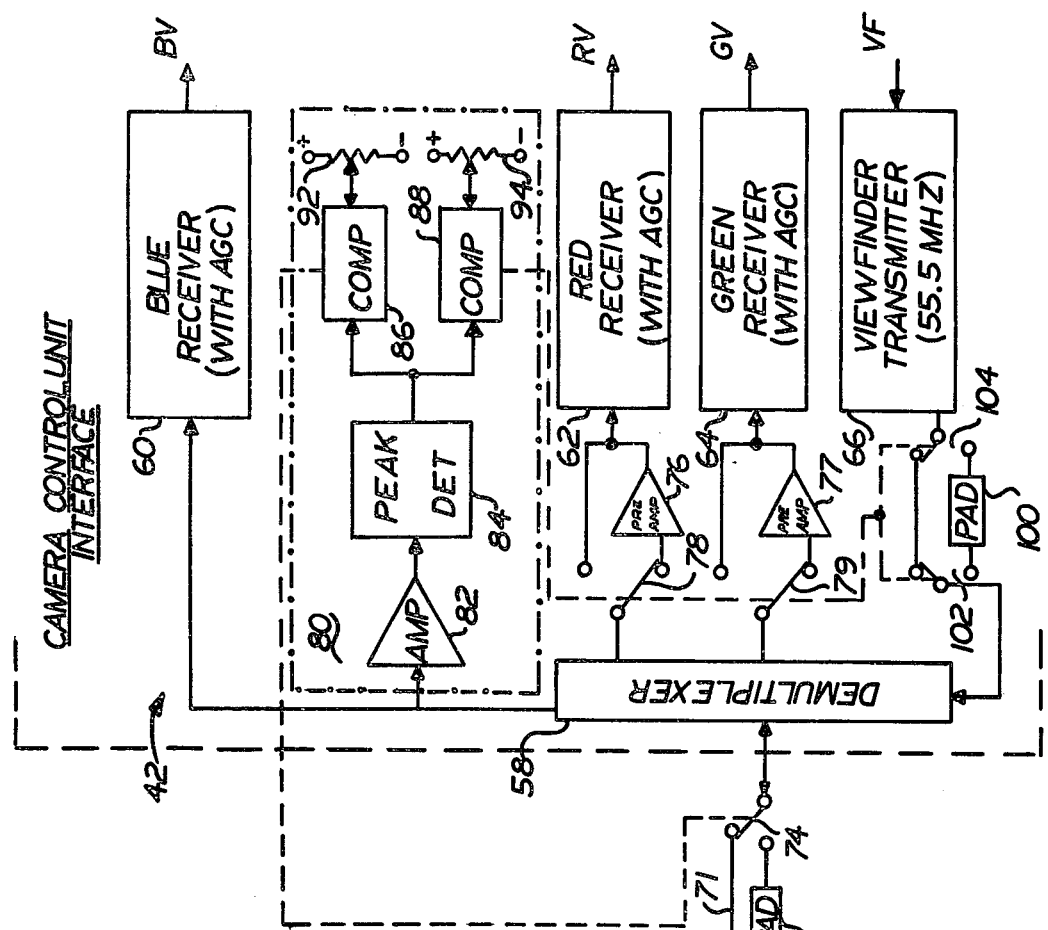
FIG. 2 is a more detailed block diagram of a camera control unit having a cable loss compensator in accordance with the present invention.
Figure 2:
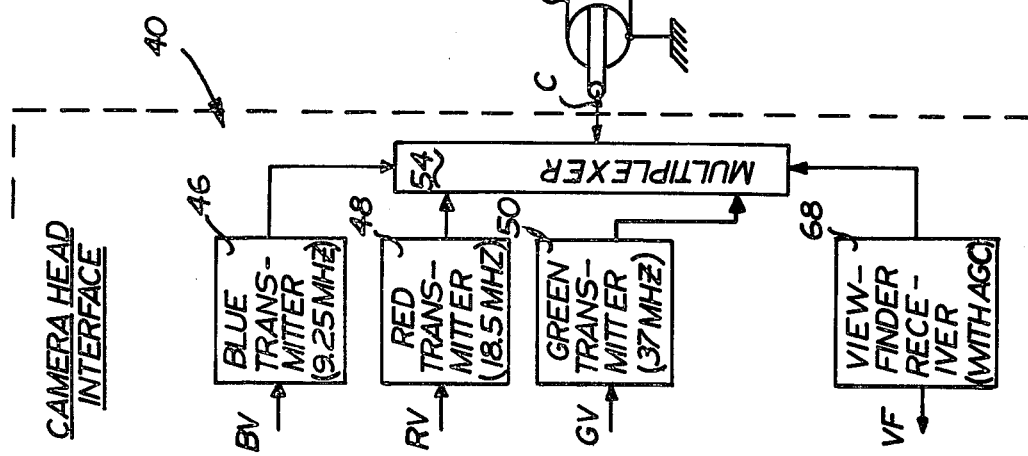

Referring now to FIG. 2, there is shown a more detailed block diagram of a portion of a camera head interface 40, interconnected with a portion of a camera control unit interface 42 by means of any suitable length of coaxial or triaxial cable 44. The camera head generates three color video signals (BV, RV, and GV) which must be transmitted to the camera control unit. In order to transmit these signals simultaneously, they are frequency division multiplexed to form a composite RF signal C which is then transmitted along the cable.

In addition to these three color video signals, additional signals may be multiplexed into the composite signals so that a single length of coaxial or triaxial cable can carry all of the control and video signals. Thus, a viewfinder video signal VF is illustrated as being returned to the camera head from the camera control unit in a separate frequency channel.

Frequency division multiplexing is accomplished in the illustrated embodiment by modulating each signal onto a separate carrier signal. Each of the video signals will thus be carried in a different frequency channel. As shown in FIG. 2, the blue, red, and green video signals are modulated onto 9.25, 18.5, and 37 MHz carrier signals by transmitters 46, 48, and 50, respectively. The modulated signals provided by these transmitters are coupled onto the transmission line 44 by a multiplexer 54 which serves to additively combine the signals to form the composite signal C. The peak amplitude of the signals in each channel is regulated at the camera head so that the peak amplitude of the signals communicated along the cable is known and remains fixed.

At the camera control unit interface 42, a demultiplexer is provided to reverse the process and separate the composite signal into its various component frequency channels. The demultiplexer 58 may comprise a network of RF filters constructed to provide a number of outputs each of which is responsive to only the signals in a single frequency channel. The blue, red, and green receivers 60, 62, and 64 respectively, each respond to the appropriate output of demultiplexer 58 and serve to recover the corresponding video signals therefrom by conventional signal demodulation techniques.

As described previously, the camera control unit my supply a video signal for use in the viewfinder at the camera head. Thus, in FIG. 2, a viewfinder transmitter 66 is illustrated at the camera control unit interface for modulating the viewfinder signal VF onto a 55.5 MHz carrier signal. The modulated signal is coupled to the transmission line 44 by circuitry included in demultiplexer 58, and is separated from the transmission line at the camera head interface by circuitry included in multiplexer 54. A viewfinder receiver 68 is provided for demodulating the viewfinder signal from the 55.5 MHz carrier.

A power supply signal, as well as various low frequency control signals, may be transmitted over the transmission line in the frequency band extending from 0 to 4 MHz. For simplicity of illustration, however, the components which generate and respond to these low frequency signals have not been included in the block diagram shown in FIG. 2.

The demultiplexer 58 should preferably have an input impedance which, as seen by the transmission line 44, is matched to the characteristic impedance of the transmission line. As a practical matter, it has been found to be extremely difficult to provide a complete match over the entire frequency range of the composite RF signal. Consequently, some reflection of the input signal power will be produced. If short cables are being employed, this reflection could produce unacceptable "ghosting" of the video signals. It is therefore desirable to interpose an attenuation pad 70 between the end of the cable 44 and the input demultiplexer 58 when short transmission cables are being used. The use of an attenuation pad of this nature will produce some attenuation of the video signals, but will also produce a far greater attenuation of the reflection components. For long cables, the attenuation provided by the cable itself will be adequate to reduce the ghosting resulting from reflections. Consequently, it would be advantageous to remove pad 70 from the circuit in those cases, since it does provide some additional attenuation of the incoming signals.

To this end, means are included for either connecting the pad 70 in series with transmission line 44, or for bypassing the pad so as to eliminate the attenuation introduced thereby. This function will preferably be implemented through use of readily available analog switches, each of which comprise FET switching elements and associated control circuitry. For convenience of description, however, and since the operation of these switches is well-known, the switches are instead illustrated as simple SPDT switches 72 and 74. These switches are jointly controlled by cable attenuation detector 80, to be described in greater detail hereinafter.

Additional problems arise because of the frequency dependent nature of the attenuation characteristics of transmission cable 44. Thus, it is known that for any given length of cable, the attenuation caused thereby will be dependent upon the square root of the frequency. The measured signal attenuation produced by a 5,000 feet length of Belden 8233 cable were:

24 db at 10 MHz
34 db at 20 MHz
46 db at 35 MHz
56 db at 55 MHz

The problem could be resolved by providing each of the color video receivers with continuously variable automatic gain control (AGC). Commonly used forms of AGC, however, tend to degrade the signal-to-noise ratio or the frequency response of the system.

The present invention contemplates providing fixed gain preamplifiers 76 and 77 for the higher frequency channels, which preamplifiers may be selectively connected into or separated from the circuit as necessary to provide a coarse adjustment of the gain of the signals. Receivers 62 and 64, which are used in conjunction with preamplifiers 76 and 77, still include a continuously variable AGC to provide a more refined adjustment of the gain of the signal. Since the AGC need not be operated over as broad a range as would otherwise be required, however, the loss of signal-to-noise ratio is not substantial. The switching of preamplifiers 76 and 77 is controlled by cable attenuation detector 80.

Cable attenuation detector 80 determines the extent of attenuation introduced by cable 44 and controls the operation of the switches associated with preamplifiers 76 and 77 and pad 70 in accordance with the results of this determintion. Since the signals supplied by the camera head have a fixed peak amplitude (which will generally correspond to the amplitude of the black level pulses transmitted concurrently therewith), any attenuation of this amplitude detected at the receiver will have been produced by the cable. The amplitude of the signal received by the camera control unit can thus be used to provide an indication of the amount of signal attenuation caused by the cable, which in turn is directly related to the length of cable being used.

Cable attenuation detector 80 is thus provided with means for monitoring the peak amplitude of one of the video channels (the blue video channel, in the illustrated embodiment). The lowest frequency channel has been selected since it suffers the least amount of attenuation when lengthy cables are being used to connect the camera control unit and the camera head. The cable attenuation detector includes a linear RF amplifier 82, a peak detector 84, and two comparators 86 and 88. Amplifier 82 amplifies the blue video signals and supplies the amplified signal to peak detector 84. The peak detector is responsive to the peak amplitude of the amplified video signal and provides an output signal having a DC voltage level indicative of this amplitude.

This peak signal is directed to two comparators 86 and 88 which comparethe amplitude of the peak signal against two fixed reference levels provided by voltage dividers 92 and 94. As long as the peak signal provided by peak detector 84 is greater than the reference level set by voltage divider 92, comparator 86 will provide an output signal which will cause switches 72 and 74 to interconnect pad 70 in series with transmission line 44. If the peak signal supplied by peak detector 84 were to fall below the reference level set by voltage divider 92, however, the output of comparator 86 would switch to a second value which would cause switches 72 and 74 to disconnect pad 70 from the circuit, instead interconnecting a bypass line 71 which provides virtually no attenuation of the video signal. In order to insure positive switching of the pad, sufficient hysterises should be designed into comparator 88 that the increase in signal strength associated with the removal of pad 70 from the line will not cause the output of the comparator to shift from the second value back to the initial value.

Comparator 88 serves the similar function of either inserting preamplifiers 76 and 77 into the circuit or removing them therefrom, depending upon the relative amplitudes of the peak signal supplied by peak detector 84 and the reference signal supplied by voltage divider 94. As long as the peak signal provided by peak detector 84 is above the reference level, the output of comparator 88 will provide a signal which will cause switches 78 and 79 to shift to the position whrein preamplifiers 76 and 77 are interconnected in series with their respective receivers 62 and 64. Should the peak signal supplied by peak detector 84 rise above the reference level supplied by voltage divider 94, however, the output of comparator 88 will shift to a second value so as to cause switches 78 and 79 to disconnect preamplfiers 76 and 77 from the circuit. The hysterisis requirements of comparator 88 are not critical since the elements which are controlled thereby do not affect the amplitude of the blue video signal. No preamplifier is required for the blue video signal, since ths signal is carried in the lowest frequency channel and is thus attenuated to a lesser extent than the signals carried in the higher frequency channels.

Preferably, reference level 94 will be adjusted such that preamplifiers 76 and 77 are inserted into the input circuits of receivers 62 and 64 at a level of cable attenuation corresponding to 40% of the maximum of cable loss which can be compensated. Reference level 92 will be adjusted so as to remove the attenuation pad 70 from the cable termination at a cable loss corresponding to 60% of the maximum loss which can be compensated. As mentioned previously, continuously variable AGC amplifiers within receivers 62 and 64 will correct for the additional cable losses associated with cable lengths between these discrete switching points.

The viewfinder transmitter 66 is also provided with a pad 100 which may be either connected in series with the output of the viewfinder transmitter or bypassed, in accordance with the positions of switches 102 and 104, to insure that the strength of the VF signals received by the camera head are within acceptable limits. In the preferred embodiment, switches 102 and 104 will be controlled by the output of comparator 88 so as to switch at the discrete switching point referred to above with reference to preamplifiers 76 and 77.

A cable los compensation system has thus been described wherein an attenuation pad may either be inserted or removed from the termination point of a transmission line which serves to interconnect broadband RF signals between a camera head and a camera control unit. The bypassing or insertion of this attenuation pad is controlled by a cable attenuation detector which responds to the peak amplitude of a signal supplied in the lowest frequency channel of the broadband RF signal. Preamplifiers are also included for selectively amplifying signals in different frequency bands so as to equalize the amplitudes of the signals in these bands when log cables are used for interconnecting the camera head and the camera control unit. In addition, an attenuation pad is supplied at the output of a viewfinder transmitter and is selectively inserted or bypassed in dependence upon the length of cable used for interconnecting the camera head to the camera control unit.

Although the invention has been described wth respect to a preferred embodiment, it will be appreciated that various rearrangements and alteration of parts may be made without departing from the spirit and scope of the present invention, as defined in the following claims.

What is claimed is:

1. In a televison camera system wherein a television camera head communicates with a remote camera control unit by means of a broadband RF signal communicated over a transmission cable of arbitrary length, compensating apparatus for automatically compensating for the arbitrary amount of attentuation of said RF signal caused by said arbitrary length of cable, said compensating apparatus comprising:

cable attenuation detector means responsive to said RF signal for providing a control signal having a value dependent on whether the peak amplitude of said RF signal is above or below a preselected reference level;

first means in the path of said RF signal for providing a substantially fixed change in the gain of said signal; and, bypassing means for selectably bypassing said first means or not, in accordance with the value of said control signal.

2. Compensation apparatus as set forth in claim 1 wherein said means for providing a fixed change in the gain of said signal comprises pad attenuator means and further wherein said bypassing means comprises means for bypassing said pad attenuator means when said control signal indicates that the peak amplitude of said RF signal has fallen below said preselected reference level.

3. Compensating apparatus for use in a television camera system wherein a television camera head generates a broadband RF signal having plural frequency channels and communicates said signal to a remote camera control unit over a transmission cable of arbitrary length, said compensating apparatus being provided for compensating for the arbitrary amount of attenuation of said RF signal caused by said arbitrary length of cable and comprising:

cable attenuation detector means responsive to at least the portion of said RF signal in a selected said frequency channel for providing a control signal having a value dependent on whether the peak amplitude of the portion of said RF signal in said selected frequency channel is above or below a preselected reference level;

preamplifier means for amplifying by a substantially fixed amount the signals associated with at least one of said frequency channels of said RF signal; and, bypassing means responsive to said control signal for selectively bypassing said preamplifier means when said control signal indicates that said peak amplitude is greater than said preselected reference level.

4. Compensating apparatus as set forth in claim 3 wherein said cable attenuation detector includes means for providing an additional control signal having a value dependent on whether said peak amplitude is above or below a second preselected reference level, pad attenuator means connected at some point in the signal path of said broadband RF signal between said camera head and said remote control station for causing a fixed amount of attenuation of said broadband RF signal, and pad attenuator bypassing means responsive to said additional control signal for bypassing said pad attenuator means whenever said additional control signal indicates that said peak amplitude is smaller than said second preselected reference level.

5. Compensating apparatus as set forth in claim 3, said television camera system having a said camera control unit which includes transmitter means for generating an RF signal in a separate frequency channel to be communicated to a corresponding receiver means at said camera head along said transmission cable, and wherein said compensating apparatus further comprises pad attenuator means interposed at some point in the signal path between said transmitter means and said receiver means for causing a fixed amount of attenuation of said RF signal generated by said transmitter means, and bypassing means responsive to said control signal for selectively bypassing said pad attenuator means when said control signal indicates that said peak amplitude is greater than said preselected reference level.

6. Compensating apparatus as set forth in claim 3, and further comprising automatic gain controlled amplifier means connected in the signal path of said at least one frequency channel of said RF signal between said preamplifier means and said camera control unit, said AGC amplifier means being provided to remove residual, transmission-cable dependent gain variations from said at least one frequency channel of said RF signal.

* * * * *